Oct. 24, 1961     A. DIXON ET AL     3,005,893
HEATING METHOD AND APPARATUS
Filed Jan. 19, 1959
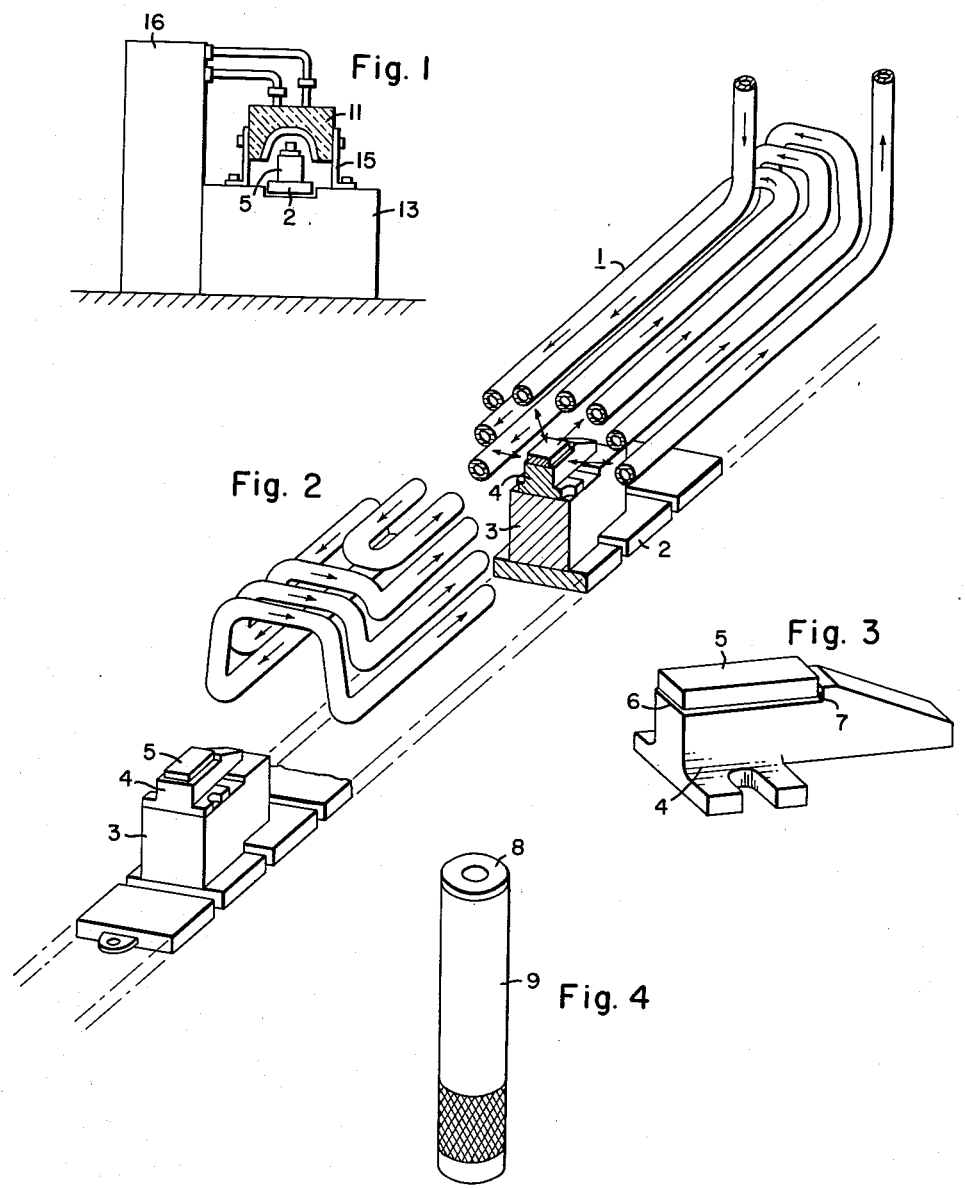
WITNESSES
INVENTORS
Austin Dixon &
John F. Weiland
BY
ATTORNEY

United States Patent Office 3,005,893
Patented Oct. 24, 1961

3,005,893
HEATING METHOD AND APPARATUS
Austin Dixon, Westmoreland City, and John F. Weiland, Pittsburgh, Pa., assignors to Westinghouse Electric Corporation, East Pittsburgh, Pa., a corporation of Pennsylvania
Filed Jan. 19, 1959, Ser. No. 787,482
7 Claims. (Cl. 219—9.5)

The present invention relates to a heating method and apparatus and more particularly to an induction heating method and apparatus wherein an alternating magnetic field is employed to effect heating of workpieces as well as to provide magnetic hold-down and locating forces for such workpieces.

In the induction heating, for soldering or brazing, for example, of relatively light weight parts, it has heretofore been found necessary to provide clamping fixtures for maintaining proper location of these small parts during such heating operation. The presence of clamping fixtures, particularly in a continuous process employing conveyors, tends to complicate the apparatus and thus to detract from the reliability and simplification of its operation.

In view of the foregoing remarks, it becomes an object of the present invention to provide an improved method and apparatus for the induction heating of electrically conductive material without need for clamping fixtures, and which is particularly suited for continuous operation in a conveyorized system.

It is a further object of the invention to provide a novel heating apparatus and method for the soldering or brazing of a wide variety of parts, wherein such parts are held in position by an electromagnetic field which also is used to heat them.

It is still a further object of the present invention to provide a novel heating method and apparatus employing an induction heating coil means which serves the twofold function of clamping and heating the parts to be soldered or brazed.

Other objects and advantages of the invention will become apparent from the following description of the invention taken in connection with the accompanying drawing in which:

FIG. 1 is an end elevation view in outline of a heating apparatus for performing the novel method;

FIG. 2 is a perspective view, partly in outline and partly in section, with a novel induction heating coil and conveyor arrangement constructed in accord with features of the invention; and FIGS. 3 and 4 are outline views of typical workpieces with which the novel heating method and apparatus of the invention may be employed to advantage.

Referring particularly to FIG. 2 in the drawing, the novel heating method and apparatus employs, in accord with the invention, a novel induction heating coil 1 which is helically wound to provide a plurality of turns shaped to form a tunnel through which the workpieces may be moved. The turns of the coil 1 extend longitudinally along opposite sides of the workpiece path as well as above such path, and the ends are arched to permit ingress and egress of the workpieces traveling therethrough. A workpiece conveyor 2, preferably disposed beneath the coil 1 for travel thereunder, carries a plurality of workpiece holders 3 which project therefrom for extension into the coil 1. The workpiece holders 3 may be made of suitable heat-resistant material, such as Transite, and each is adapted to carry a workpiece 4 of electrically conductive material, such as a copper or brass member, for example, to which a small part 5 of electrically conductive material is to be secured by a thermally responsive bonding material such as soldering or brazing.

The dimensions of the coil 1 will be such as is suitable to accommodate the size of workpieces being handled. In practice it has been found that a coil 1 sixteen inches long and consisting of four turns of ⅜ inch outside diameter copper tubing spaced ⅛ inch apart and operated at approximately 75 kilowatts and a frequency of 9600 cycles per second provides satisfactory heating, hold-down forces and locating forces when employed in conjunction with the brazing of small parts 5 each approximately ½ inch square and ⅛ inch thick to the copper or brass members 4 each approximately 1½ inches long and ½ inch high.

In the performance of the heating and hold-down operation of the invention, the high frequency current passed through the coil 1 induces eddy currents in the parts of the workpieces presented to such coil, and these eddy currents not only create the bonding or brazing heat, but also produce magnetic fields in the workpiece parts which oppose the field of the coil 1. The interaction of the magnetic fields in the parts and coil provides aligning and clamping forces which effectively transversely locate and hold-down the relatively small parts 5 to the larger parts 4.

During continuous operation, while the workpiece conveyor 2 is in motion, the workpieces 4 are placed on the workpiece holders 3 at the entrance to the coil 1, a suitable heat-responsive bonding, soldering or brazing material 6, such as silver solder and flux, is introduced successively onto the surfaces of the workpieces 4 to which the small parts 5 are to be secured, and such parts 5 are then introduced to the upper surface of the bonding material 6. As the parts thus carried by the workpiece holders 3 are caused to pass through the coil 1, these parts are heated by the coil 1, the material 6 melts and is squeezed between the two surfaces of parts 4 and 5 by the magnetic clamping force created by such coil 1. This squeezing action assures the proper intimate association between the bonded surfaces of parts 4 and 5 for maximum joint strength. In addition, transverse forces created by the coil 1 and acting on the parts 5 will align same properly with the complementary surface of part 4 in the event that such parts 5 become misaligned with respect to such surface before entering the coil.

For best results with respect to automatic alignment of parts, the pieces being bonded or brazed should have complementary mating surfaces of substantially the same size and shape. Also, certain parts, such as those shown in FIG. 3 find advantage in provision of a locating shoulder 7 in one of the parts 4 against which the part 5 will be urged during travel through the coil 1, thereby accurately defining location of such part 5 in the presence of the forces acting thereon within such coil. Even in absence of such shoulder, however, the novel method and apparatus of the invention has been found to perform satisfactorily in the locating and brazing of thin lightweight parts such as non-ferrous annular contact element 8 to the tips of non-ferrous rods 9, for example, as shown in FIG. 4.

Automatic unloading of the workpieces may be provided for by suitable movement of the workpiece conveyor 2 after the workpiece holders 3 leave the coil 1.

Since the process or method and apparatus of the invention requires a coil design which produces an electromagnetic field that is less localized than that of a conventional heating coil, overall heating of the workpieces generally takes place. Consequently, the present method and apparatus might require special provisions for dissipation of this heat where the parts otherwise would be adversely affected.

Support of the coil 1 above the workpiece conveyor means may be provided for in any suitable manner such as by the nesting of such coil within longitudinally spaced apart uprights 11, one of which is shown in FIG. 1, of suitable electrically-insulating and heat-resistant material which in turn may be mounted on such as a table 13 through the medium of brackets 15. The coil 1 may be suitably energized by connection to a source 16 of high frequency power and availed of cooling water by means which may be associated with such source 16. With simple changes in power input, coil height and workpiece holders, a wide variety of workpieces can be handled on a single apparatus setup. Such flexibility permits many short production runs to be combined, even though the activity of any one apparatus would not normally be considered sufficiently versatile to justify continuous operation in a conveyorized manner.

From the foregoing it will be apparent that the present novel heating method and apparatus wherein induction brazing of parts may be effected without employment of complicated locating and hold-down fixtures, enables the brazing of a wide variety of relatively small parts in a relatively simple and expeditious manner and without necessitating the meticulous placement of such parts which become automatically aligned during operation of the apparatus.

We claim as our invention:

1. The method of securing an electrically conductive material to a second material, comprising interposing heat responsive bonding material between said electrically conductive material and said second material, placing such assemblage on a movable support, and moving such assemblage and support through an alternating magnetic field of a frequency and distribution which induces currents in said electrically conductive material causing heating of same, melting of such bonding material, and creation of forces holding such assemblage together in reaction with the support during transit through said field in the presence of the molten bonding material.

2. The method of brazing a first electrically conductive material to a second electrically conductive material with a brazing material sandwiched therebetween, comprising placing such assemblage on a support, passing such assemblage while on such support through a tunnel-shaped coil energized to produce an alternating magnetic field of a frequency and distribution which induces currents in the two electrically conductive materials, causing heating of same, melting of said bonding material, and creation of an opposing magnetic field which holds such materials on the support.

3. The method of brazing a first non-ferromagnetic metal article to a second non-ferromagnetic article, comprising the interposition of a brazing material between the two articles, placing such assemblage on a support and causing the assemblage and support to be brought into the influence of an alternating magnetic field of a frequency and distribution which induces currents in the articles, causing heating of same, melting of the brazing material, and creation of a magnetic field opposing the aforesaid field which holds the assemblage on the support.

4. The method of brazing a first non-ferromagnetic metal article to a second non-ferromagnetic article, comprising the interposition of a thin layer of brazing material between similarly sized and shaped respective surfaces of the two articles, placing the assemblage on a support, and causing such assemblage while on the support to be passed through a tunnel-shaped coil producing an alternating magnetic field of a frequency and distribution which induces currents in the articles, causing heating of same, melting of said brazing material, and creation of an opposing magnetic field which holds the assemblage on its support and maintains coincidence of their similarly sized and shaped surfaces during transit through the coil in the presence of the molten bonding material.

5. An electrical apparatus for the heating and hold-down of a non-ferromagnetic metal article, comprising a tunnel-shaped induction heating coil, support means for holding such article within said coil, and means for energizing said coil to create an alternating magnetic field which induces current in said article which heats same and creates an opposing magnetic field urging said article toward said support.

6. An electrical apparatus for the heating, hold-down and transverse location of a metal article, comprising a stationary tunnel-shaped induction heating coil, workpiece carrier support means for introducing such article into said coil, and high frequency generator means for energizing said coil to create an alternating magnetic field which induces currents in said article which heats same and creates an opposing magnetic field urging said article toward said support means and toward a position equidistant the sides of said coil.

7. An electrical apparatus for the heating, hold-down and transverse location of non-ferromagnetic metal articles for bonding onto second non-ferromagnetic metal articles by a thermally responsive bonding material placed therebetween, comprising a helically-wound tunnel-shaped induction heating coil having turns continuing along top and sides and over opposite ends, workpiece carrier means for moving the sandwiched assemblages of articles and bonding material through said tunnel-shaped induction heating coil, and high frequency generator means for energizing said coil to create an alternating electromagnetic field which induces currents in said articles, causing heating of same, melting of said bonding material, urging of the upper articles toward the lower articles, and transverse location of the upper articles with respect to the lower articles.

References Cited in the file of this patent

UNITED STATES PATENTS

Re. 22,322     Goodridge             May 25, 1943

FOREIGN PATENTS 385,285     Great Britain           Mar. 17, 1931